W. L. DEMING.
EGG BOILER.
APPLICATION FILED JULY 28, 1913.
1,138,850.
Patented May 11, 1915.
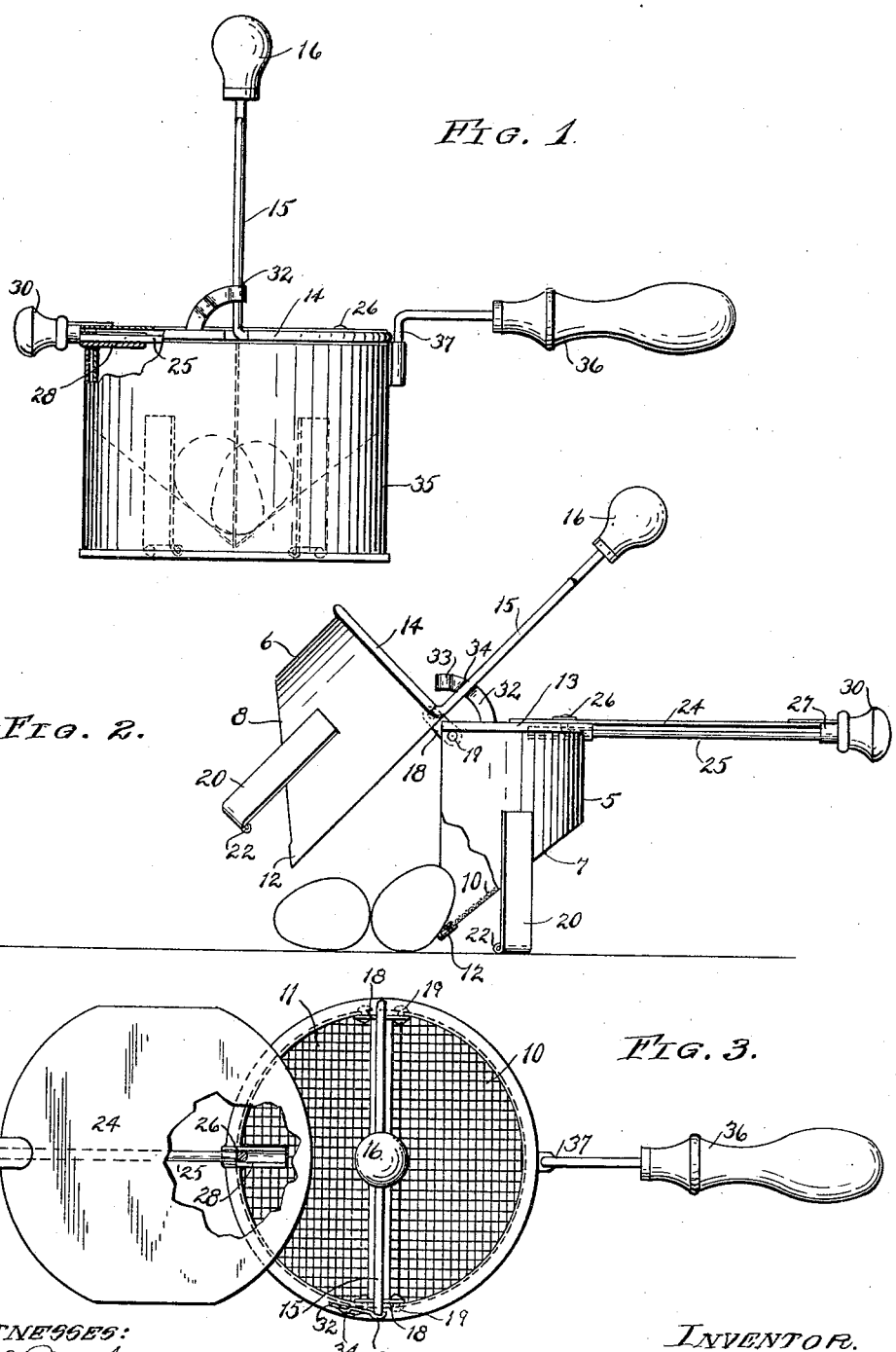

UNITED STATES PATENT OFFICE.

WILLIAM L. DEMING, OF SALEM, OHIO.

EGG-BOILER.

1,138,850.  Specification of Letters Patent.  Patented May 11, 1915.

Application filed July 28, 1913. Serial No. 781,482.

*To all whom it may concern:*

Be it known that I, WILLIAM L. DEMING, citizen of the United States, residing at Salem, in the county of Columbiana and State of Ohio, have invented a certain new and useful Improvement in Egg-Boilers, of which the following is a full, clear, and exact description, reference being had to the accompanying drawings.

This invention relates to new and useful improvements in egg boilers.

An object of the invention is to provide a receptacle for the eggs in which they may be readily boiled and from which they may be conveniently removed without having to dip them out of the boiling water, or having to pour the water off before removing them.

Another object is to provide a holder for the eggs which may be set into any dish of water for boiling or may be used in connection with a special receptacle which is entirely covered by the cover of the holder to facilitate the boiling.

These and other objects will be hereinafter described.

In the drawings, Figure 1 is a side elevation of my egg boiler, shown in connection with a receptacle with which it is adapted to be used. Fig. 2 is a side elevation of the egg holder showing it in an open position discharging the eggs. Fig. 3 is a plan of the egg holder and receptacle showing the cover of the holder in its open position.

5 and 6 indicate two semi-cylindrical portions being open at the top and inner sides, and having their lower edges cut away at 7 and 8 on an angle slanting toward the inner side of the holder, and coming together at the center when in inclosed position. Across these two lower sides are screens 10 and 11 secured to the edges 7 and 8 and to suitable supports 12 formed across the inner portion of these members 5 and 6. These screens form a suitable bottom upon which the eggs rest while being boiled, and which allow a free passage of the boiling water from the outer receptacle to the eggs within the holder. The upper edges of these members 5 and 6 are turned over as at 13 and 14 to furnish stiffness for the upper portion of these members. Rigidly held on the upper portion of the member 6 by the turned over portion 14 is a wire 15 which is brought upwardly and then together at the middle portion, and supports a suitable grip 16 forming a handle. The two members 5 and 6 are pivoted together near their upper edges by means of links 18 rigidly secured to the member 6, and pivotally secured at 19 to the member 5. This allows the members to be opened as shown in Fig. 2 by swinging one member away from the other, about the pivot 19.

When in position in the receptacle, the holder is adapted to stand on four legs 20, two of which are shown in Fig. 2. These legs are suitably secured to the sides of the members 5 and 6, and preferably turned upwardly at their lower ends, as at 22, so that they may be readily inserted into a receptacle fitting the holder, and also to present a smoother surface, so that they will not mar any surface upon which the holder may be set.

The holder is adapted to be covered in a closed position by means of a cover 24, slidable across the top of the member 5 by which it is supported, and across the member 6 when in its closed position. This cover is mounted upon a rod 25, to which it is secured at 26 and 27. This rod is slidable in a tubular guide 28, carried by the upper portion of the member 5. On the outer end of the rod 25 is a small knob 30, which forms a handle for moving the cover and for holding the member 5 while moving the member 6 to open or close the holder. A portion of the upper part of the guide 28 is cut away to allow the up-turned end 26 of the rod 25 to come nearly out of the guide to allow the cover to be opened widely for the insertion of the eggs, as shown in Fig. 3.

The holder may be held opened or closed by means of a detent spring 32 secured to the upper part of the member 5. This detent spring is made arcual, substantially about the pivot 19 as a center, and has therein two notches 33 and 34, which engage the bail 15. This holds the parts opened or closed, as desired, while allowing the parts to be readily moved by hand. A suitable receptacle may be made especially for use with this holder, such as indicated at 35 in Fig. 1. This receptacle is of the proper height and diameter to contain the holder in closed position, a suitable handle as at 36, may be provided for this receptacle 35 and carried by a bent rod 37 secured to the side of this receptacle. Now when the holder is used with this receptacle, the cover 24 entirely closes the top of the holder and the flange or the outwardly turned edges 13 and 14 rest upon the upper edge of the receptacle. Thus the receptacle is entirely closed which greatly facilitates the boiling.

To use my device it is only necessary to open the cover, as shown in Fig. 3, and place any suitable number of eggs therein, and then place in a dish of water, which is then boiled. If used with the special receptacle 35, the holder is placed therein, the receptacle having been previously partly filled with water, and the cover is closed as in Fig. 1, thus closing the receptacle and holder. After boiling a suitable length of time it is only necessary to remove the entire holder from the stove or burner by means of the handle 36, and lift the holder itself out of the receptacle by means of the handle 16, the screens 10 and 11 allowing all of the water to stay in the receptacle. The eggs may be then removed from the holder by swinging the members 5 and 6 apart, as shown in Fig. 2, or preferably with both the lower edges resting upon a plate or pan into which the eggs are to be placed. This allows the eggs to roll gently out of the holder without cracking them.

To conveniently cool the eggs with my device, it is only necessary to dip it with the eggs, into a dish of cold water or to open the cover and hold the same under the spigot, allowing the water to run over the eggs and through the screens. Thus it will be seen that my device is convenient to use, is efficient in operation, and has many useful features.

Having thus described my invention, what I claim is:

1. In an egg boiler, the combination of a holder having two parts, means for hinging these two parts together near their upper edges, an opening through the bottom of each part, a bail rigid with one part, a handle carried by the bail, and a cover carried by the other part adapted to close over the holder in its closed position.

2. In an egg boiler, the combination of a holder having two parts, means for hinging these two parts together near their upper edges, screens mounted in the bottom of these two parts and slanting toward the center, a bail rigid with one part a handle carried by the bail, and a cover slidably carried by the other part.

3. In an egg boiler, the combination of a holder made in two parts and open at the top, screens mounted in the bottom of each part and slanting toward the center, said screens coming together in a substantially straight line across the bottom of the center, legs rigid on each part, a bail rigid on one part, a handle carried by the bail a cover carried by the other part and slidable across the top of both parts when in the closed position, and means for holding each part in an open or closed position.

4. In an egg boiler, the combination of a holder comprising two parts suitably hinged together at their upper edges, screens mounted on the bottom of each part and meeting along a straight edge across the center of the bottom, a bail rigid with one part, a handle carried by the bail, and a detent spring having notches engaging the bail to hold the receptacle in opened or closed position.

5. In a device of the character described, the combination of a holder comprising two parts hinged together at their upper portions and having openings through the bottom portion of each part, a bail rigid with one part, and a detent spring rigid with the other part having notches adapted to engage the bail to hold the receptacle in an open or closed position.

6. In an egg boiling device, the combination of a holder made of two parts hinged together near their upper edges, each part having an opening through its bottom, a handle provided for one of the parts, and a sliding cover carried by the other part and adapted to close over both parts and itself provided with a handle.

7. The combination of a holder having two parts hinged together near their upper edges and provided with bottoms having openings, a bail rigidly connected with one part, and a sliding cover connected with the other part and adapted to close over both parts.

In testimony whereof, I hereunto affix my signature in the presence of two witnesses.

WILLIAM L. DEMING.

Witnesses:
J. B. HULL,
ALBERT H. BATES.

Copies of this patent may be obtained for five cents each, by addressing the "Commissioner of Patents, Washington, D. C."